United States Patent
Yang et al.

(10) Patent No.: US 7,388,878 B2
(45) Date of Patent: Jun. 17, 2008

(54) METHOD AND APPARATUS FOR PROVIDING A CONTROL FRAME DURATION CORRELATED TO DATA FRAME DURATION

(76) Inventors: Liuyang Lily Yang, 17126 NW. Blacktail Dr., Portland, OR (US) 97229; Xingang Guo, 15274 NW. Casey Dr., Portland, OR (US) 97229; Jing Zhu, 555 NE. 58th Ave., Hillsboro, OR (US) 97124

( * ) Notice: Subject to any disclaimer, the term of this patent is extended or adjusted under 35 U.S.C. 154(b) by 551 days.

(21) Appl. No.: 11/058,003

(22) Filed: Feb. 14, 2005

(65) Prior Publication Data

US 2006/0182032 A1  Aug. 17, 2006

(51) Int. Cl.
*H04Q 11/00* (2006.01)

(52) U.S. Cl. .................................................. 370/447
(58) Field of Classification Search ................. 370/445
See application file for complete search history.

(56) References Cited

U.S. PATENT DOCUMENTS

| | | | |
|---|---|---|---|
| 4,764,920 A * | 8/1988 | Furuya ........................ 370/437 |
| 6,765,924 B1 | 7/2004 | Wu et al. |
| 2003/0123405 A1* | 7/2003 | del Prado et al. ........... 370/331 |
| 2005/0129051 A1* | 6/2005 | Zhu et al. .................... 370/445 |
| 2006/0072492 A1* | 4/2006 | Trainin ........................ 370/328 |

* cited by examiner

*Primary Examiner*—Chau Nguyen
*Assistant Examiner*—Louis Bell
(74) *Attorney, Agent, or Firm*—Schwabe, Williamson & Wyatt, P.C.

(57) ABSTRACT

Methods and apparatus for transmitting a signal having a first frame duration being correlated to a second frame duration are described herein.

23 Claims, 5 Drawing Sheets

METHOD AND APPARATUS FOR PROVIDING A CONTROL FRAME DURATION CORRELATED TO DATA FRAME DURATION

TECHNICAL FIELD

Embodiments of the invention relate generally to the field of networks, and more particularly to transmitting a signal having a first frame duration correlated to a second frame duration over such networks.

BACKGROUND

In networks, a transmitting node may use carrier sensing to determine if a shared medium is available so as to avoid packet collision. In a wireless network, the two types of carrier sensing typically used are physical carrier sensing, by the physical layer that samples the radio-frequency (RF) energy level in the medium, and virtual carrier sensing, by the media-access control (MAC) layer that updates a node's network allocation vector. A node maintains a network allocation vector to indicate the period(s) during which the medium is reserved by other nodes; hence, it knows when not to transmit.

When contending for the medium, a node broadcasts its intended transmission period. Each node that receives the broadcast updates its network allocation vector. When implemented correctly, the use of network allocation vector may reduce the power consumption needed for frequent sampling of the medium. Unfortunately, the mechanism for maintaining network allocation vectors in current networks typically requires that a node accurately decode a control frame, sent either by the transmitting node or the receiving node, which contains the network allocation vector information. If for any reason the node fails to decode the control frame, its network allocation vector will be inaccurate.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include virtual carrier sensing using the duration of a control frame to convey network allocation information.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
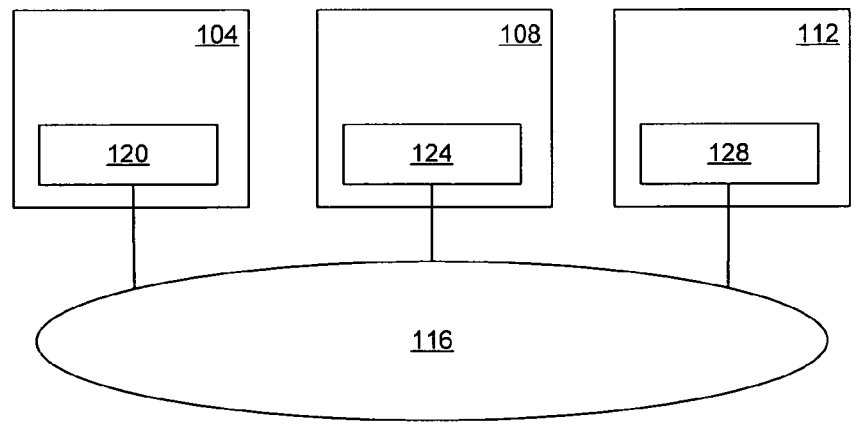
FIG. 1 illustrates a network comprising multiple nodes in accordance with an embodiment of the present invention.

FIG. 1 illustrates a network 100 having nodes 104, 108, and 112 coupled to a shared medium 116 in accordance with an embodiment of the present invention. Each of the nodes 104, 108, and 112 may have respective network interface controllers 120, 124, and 128 to facilitate communication with other nodes over the medium 116.

One or more of the nodes 104, 108, and 112 may employ a contention protocol that facilitates the nodes' access to the medium 116 in a manner to reduce the occurrence of data collision. Data collision may occur when two or more nodes are simultaneously transmitting over the shared medium 116.

In one embodiment, the node 104 may intend to transmit data to the node 108. In this embodiment, the network interface controller 120 may generate a control frame whose length is correlated to the length of time the two nodes 104 and 108 may occupy the medium 116 for the transmission of the data. The network interface controller 120 may perform a carrier-sensing task, e.g., to check to see if the medium 116 is preoccupied with another transmission, followed by transmission of the control frame followed by a data frame. The node 112 may be conveyed information relating to network allocation by detecting the length of time the control frame is transmitted, which may be proportioned to the length of time the data frame will be transmitted. In such a manner, the node 112 may be conveyed network allocation information without being required to decode content of a control frame.

In various embodiments, the network 100 may have a wide variety of topologies, protocols, and/or architectures. For example, in one embodiment, the network 100 may be a wireless distributed network having a carrier-sensing multiple access/collision avoidance (CSMA/CA) architecture. In an embodiment the network 100 may comply with one or more standards for wireless communications, including, for example, one or more of the IEEE 802.11(a), 802.11(b) and/or 802.11(g) (ANSI/IEEE 802.11 standard, IEEE std. 802.11-1999, reaffirmed Jun. 12, 2003) standards for wireless local area networks (WLANs), along with any updates, revisions, and/or amendments to such. In various embodiments, the network 100 may additionally or alternatively comply with other communication standards.

In various embodiments, the medium 116 may be a wire media such as, but not limited to, coaxial, twisted pair, or optical fiber. In other embodiments, the medium 116 may be a wireless medium, e.g., radio frequency (RF) or infrared (IR). In an embodiment where the medium 116 is a wireless medium, the network interface controllers 120, 124, and 128 may have transmitters and/or receivers that are adapted to operate on a channel frequency in a range between, e.g., 2400 Megahertz (MHz) and 2495 MHz or 5170 MHz and 5810 MHz.

Figure 2:
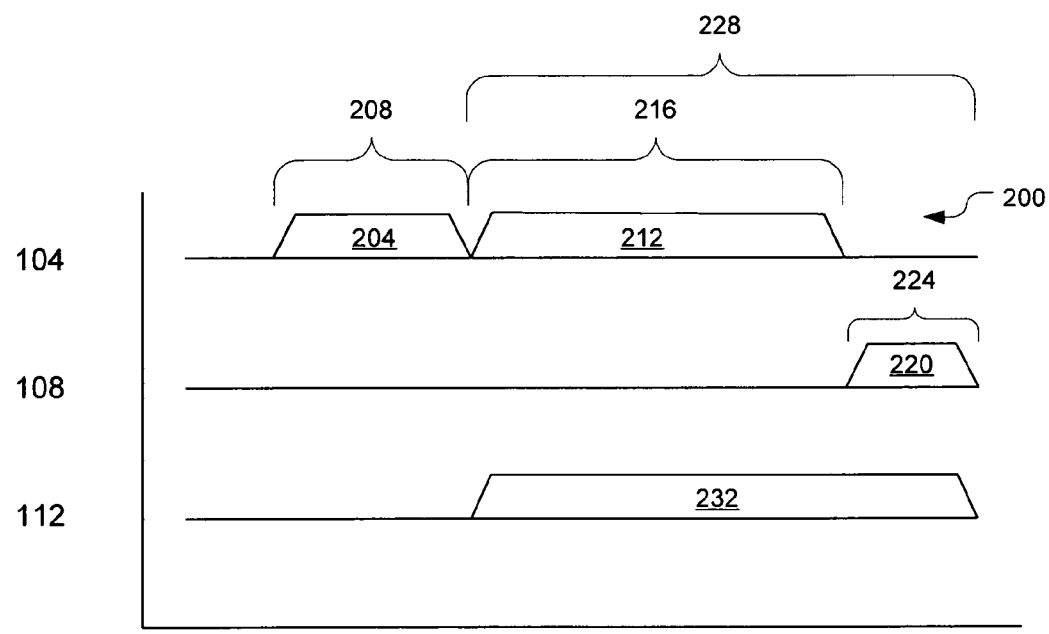
FIG. 2 illustrates a wave form graph depicting frame transmissions between nodes in accordance with an embodiment of the present invention.

FIG. 2 illustrates waveform graphs for transmission sequences between the node 104 and the node 108 in accordance with an embodiment of the present invention. In particular, the network interface controller 120 may transmit a signal 200 over the medium 116. The signal 200 may include the control frame 204 being transmitted for a control-frame duration 208 followed by the transmission of a DATA frame 212 for a DATA-frame duration 216. In one embodiment, the DATA frame 212 may include information about the intended recipient of the transmission in a header followed by the data as a payload. Upon successful receipt of the information by the intended recipient, e.g., node 108, the network interface controller 124 of the recipient node 108 may respond by transmitting an acknowledgement frame 220 for an ACK-frame duration of 224.

As briefly discussed above, the control-frame duration 208 may be correlated to the DATA-frame duration 216 in order to convey information about the time that the nodes 104 and 108 will be occupying the medium 116. In one embodiment, the ACK-frame duration 224, which may be fixed, may be included in the total preoccupation time 228, e.g., DATA-frame duration 216+ACK-frame duration 224, for the medium 116 for a transaction.

The node 112 may sense the control frame 204, and more particularly the duration 208, and update its network allocation value (NAV) 232, which may indicate the anticipated preoccupation time 228 of the medium 116. Because the control frame 204 may be used to update the NAV 232, it may hereinafter also be referred to as the NAV frame 204. In various embodiments, the NAV 232 may be a network allocation vector.

In various embodiments, the node 104 may separate transmission of the NAV frame 204 from the DATA frame 212 by a certain interval. This interval may facilitate the node 112 distinguishing and recognizing the distinct frames based on duration. In one embodiment, duration 208 may be within a range of [T1, T2]; the duration 224 may be a duration T3, which is greater than T2; and duration 216 may be within a range of [T4, T5], where T4 is greater than T2. Having these time values ascribed to these durations may facilitate a bystander node being able to sense a frame with a duration equal to or less than T2 and rely on this as the NAV-frame duration 208.

In one embodiment, a jumbled NAV frame may be formed when more than one NAV frames are being sent by different transmitting nodes and the frames are overlapping in time such that other nodes cannot distinguish one NAV frame from another. If the total frame duration of such jumbled NAV frame is still in the range of [T1, T2], nodes will still be able to update their NAVs correctly. If the duration of such jumble NAV frame is longer than T2, a receiving node may attempt to decode it as either an ACK frame or DATA frame. In this embodiment, a cyclical redundancy check may be used to determine that the data or acknowledgement is invalid and that the packet may be discarded.

Figure 3:
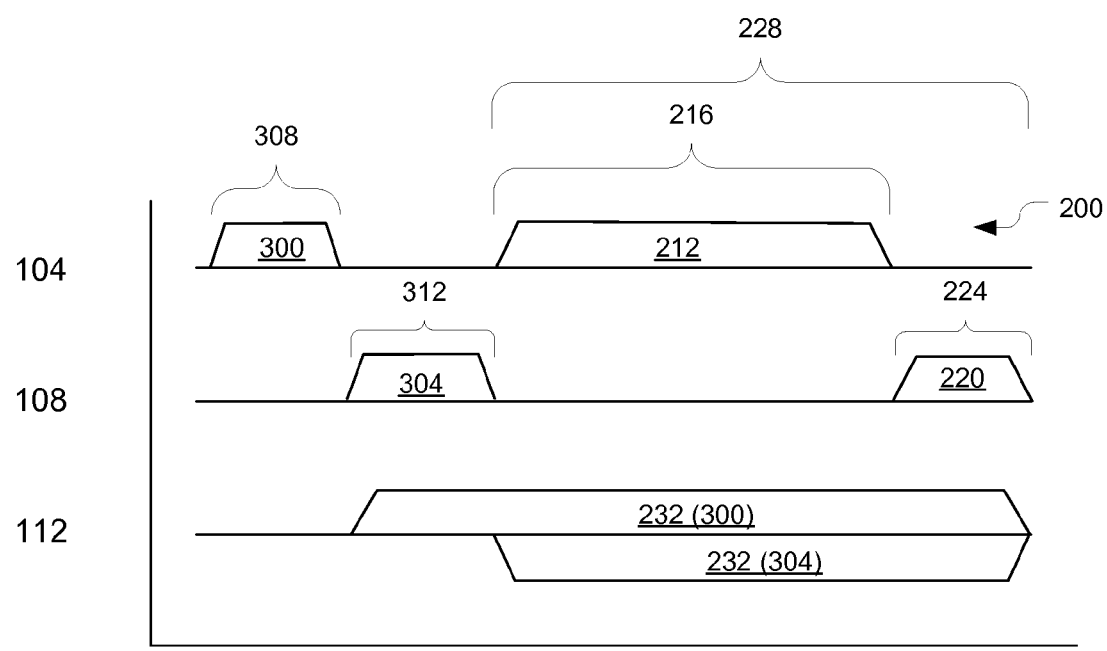
FIG. 3 illustrates a wave form graph depicting frame transmissions between nodes in accordance with another embodiment of the present invention.

FIG. 3 illustrates waveform graphs for transmission sequences between the node 104 and the node 108 in accordance with another embodiment of the present invention. In this embodiment the node 104 may send a first control frame 300 while the node 108 responds with a second control frame 304. The control frame 300 may be sent by the node 104 as a request to send data, while the control frame 304 may be sent as a reply to the frame 300 indicating that the node 108 is waiting for the upcoming transmission. In this embodiment the control frame 300 may be transmitted for a duration 308 that may provide an indication to node 112 of how long the remaining anticipated communicative exchange may occupy the medium 116. Node 112 may rely on this information to update its NAV 232(300). The control frame 304 may be transmitted for a duration 312, which may be shorter than the duration 308, and may be used to update the node 112's NAV 232(304). In this manner, the node 112 may update its NAV based on one or both control frames 300 and 304.

In various embodiments, a control frame may also be sent as a polling control frame, e.g., a contention-free (CF) poll frame. For example, an access point may send a control frame indicating that a station may have contention free access to a shared medium. The duration of this control frame may be used to communicate to other nodes in the network the period that the medium is reserved for the station.

Figure 4:
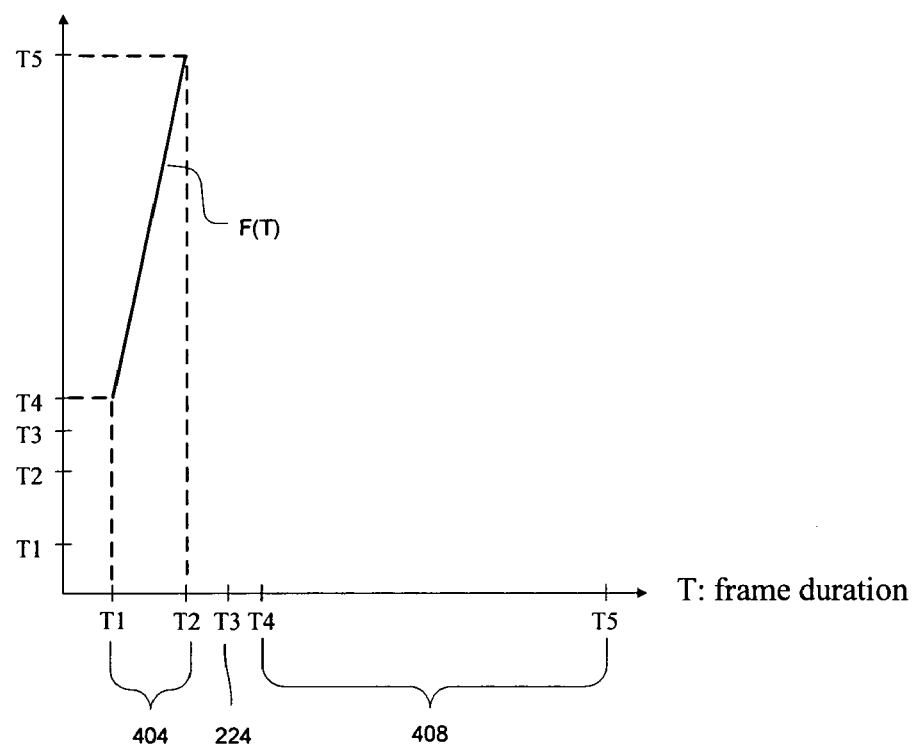
FIG. 4 illustrates a graph representing a mapping function to map a NAV-frame duration to a data-frame duration in accordance with an embodiment of the present invention.

Referring again to FIGS. 1 and 2, the network interface controller 128 of node 112 may sense the NAV-frame duration 208 and use a mapping function to determine the preoccupation time 228 to be used for the updating of its NAV 232. FIG. 4 illustrates a monotonically increasing function F(T) that may map a received NAV-frame duration 208 to an expected DATA-frame duration 216 in accordance with an embodiment of the present invention. In this embodiment, the network interface controller 128 may sense a frame that has a duration that is in the range 404 of [T1, T2] and map that duration, using the F(T) mapping function, to a correlating duration within the range 408 of [T4, T5]. In this manner, the F(T) mapping function may represent a correlation between the NAV-frame duration 208 and the DATA-frame duration 216. The network interface controller 128 may then add the ACK-frame duration 224 to the expected DATA-frame duration to determine the total preoccupation time 228 used for the NAV 232. In other embodiments, the F(T) mapping function may map the NAV-frame duration 208 more directly to the total preoccupation time 228.

Figure 5:
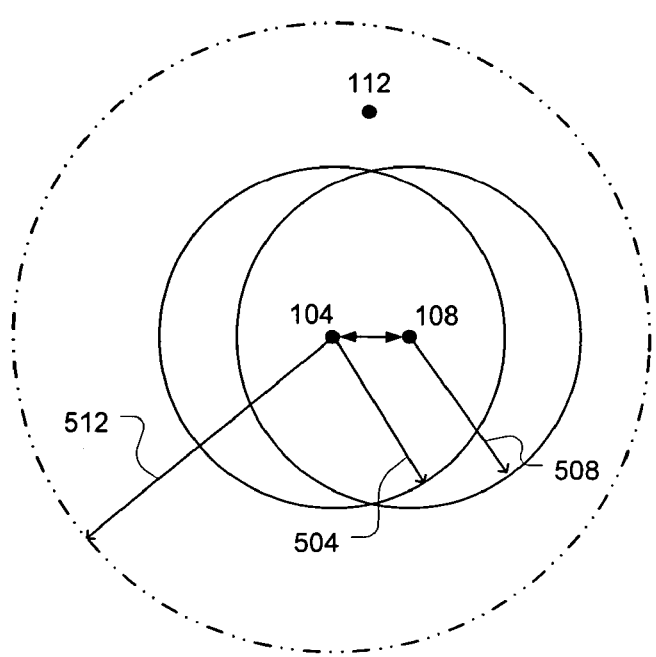
FIG. 5 illustrates a map representing the approximate physical separation of nodes in accordance with an embodiment of the present invention.

FIG. 5 illustrates a map representative of the physical separation of nodes 104, 108, and 112, in accordance with an embodiment of the present invention. In this embodiment, the node 104 may have a transmission range 504 and the node 108 may have a transmission range 508. As used herein, a transmission range may be the distance that a node may transmit a signal with sufficient strength to be accurately decoded by a receiving node. Prior art contention protocols rely on request-to-send (RTS) and clear-to-send (CTS) frames, sent by a transmitting node and a receiving node, respectively. Bystander nodes must be able to decode these frames in order to receive information about the upcoming transmissions so that they may update their NAVs accordingly. However, as illustrated in FIG. 5, the node 112 is outside of both transmission ranges 504 and 508 and therefore is unable to accurately decode either the RTS or the CTS frames. Nevertheless, transmissions from the node 112 may interfere with transmissions from the node 104 and/or the node 108.

Even though the node 112 is outside of the transmission ranges 504 and 508 it may still be within an energy sensing range (ESR) 512 of the transmitting node 104. Therefore, the present embodiment may allow the node 112 to sense the control frame 204 and update its NAV frame based, at least in part on the duration 208, even though it may be outside of the range required to accurately decode information in the control frame 204 itself. This may in turn facilitate more accurate updates of NAV 232 and reduce the amount of unnecessary physical sensing of the medium 116 by the node 112.

Correlating the NAV-frame duration 208 to the DATA-frame duration 216 and ultimately to the total preoccupation time 228 may allow all of the nodes within the ESR 512 of the node 104 to update their NAVs based at least in part on the duration 208. In a similar fashion, the embodiment described in FIG. 3 would allow all of the nodes within the ESR of either the node 104 or the node 108 to update their NAVs based at least in part on durations 308 and/or 312.

Figure 6:
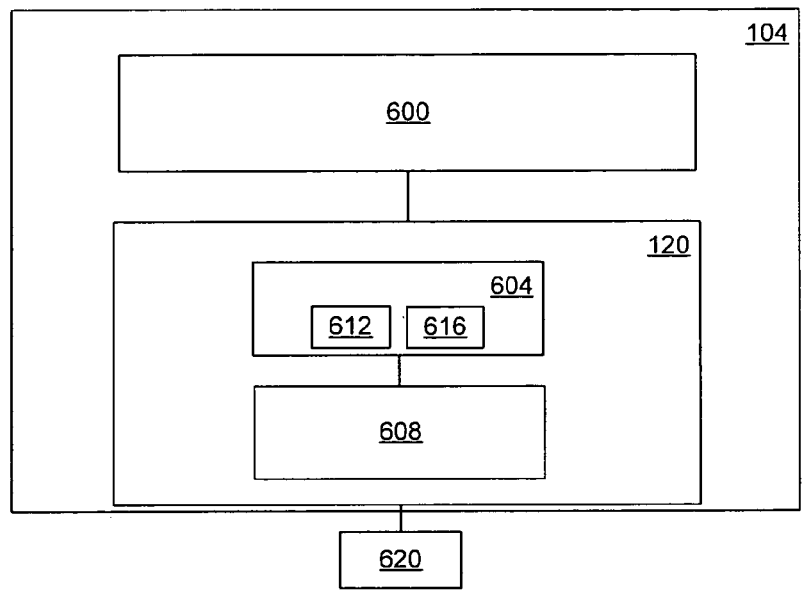
FIG. 6 illustrates a node in accordance with an embodiment of the present invention.

FIG. 6 illustrates the node 104 in greater detail in accordance with an embodiment of the present invention. In this embodiment the node 104 may include a processor 600 coupled to the network interface controller 120. The network controller interface 120 may have a media-access control block 604 coupled to a physical-signaling block 608 as shown. The media-access control block 604 may include a transmitter 612, a receiver 616, and circuitry to implement a contention protocol to facilitate access to the medium 116. The physical-signaling block 608 may be a mechanism for providing physical signaling on the medium 116. In one embodiment, the media-access control block 604 may use the physical-signaling block 608 for various functions involved in carrier sensing, transmission of frames, and/or reception of frames. In one embodiment, the network interface controller 120 may be coupled to an antenna 620 to facilitate communication with a medium 116 that is a wireless medium. In various embodiments, the antenna 620 may be integrated or external to the node 104 and may be a monopole or a dipole antenna.

The media access control block 604 may use an F'(T) mapping function, which may be an inverse of the F(T) mapping function discussed with reference to FIG. 4, to generate the NAV frame 204. In one embodiment, the F'(T) mapping function may map the intended DATA-frame duration 216 to the NAV-frame duration 208. The media-access control block 604 may then map the NAV-frame duration 208 to a frame-byte length for the NAV frame 204.

In another embodiment the F'(T) mapping function may be used to map the total preoccupation time 228 to the NAV-frame duration 208. This may be the case when F(T) more directly maps the NAV-frame duration 208 to the preoccupation time 228.

In one embodiment, to avoid ambiguity in mapping the NAV-frame duration 208 to the frame-byte length, it may be assumed that NAV frames and/or ACK frames are sent at a predetermined data rate.

In various embodiments, the nodes 104, 108, and 112 may represent a wide variety of devices capable of networking with other devices. In various embodiments, the nodes 104, 108, and/or 112 may be stations and/or access points such as, but not limited to, a palm-sized computing device, a tablet computing device, a desktop computing device, a network access device, a router, a hub, and a switch.

Figure 7:
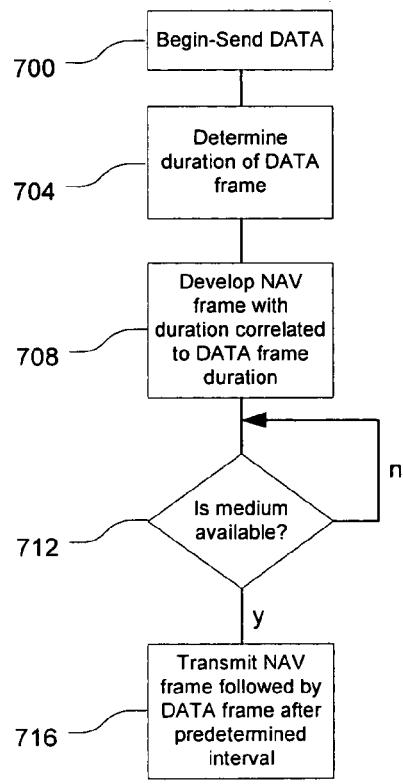
FIG. 7 illustrates a transmission operational flow of the network interface controller in accordance with an embodiment of the present invention.

FIG. 7 illustrates a transmission operational flow for a media-access control block in accordance with an embodiment of the present invention. In this embodiment, a transmission may begin with a send DATA command 700 from a processor. The intended DATA-frame duration may be determined based on the frame-byte length and the expected data rate 704. A NAV frame may then be developed such that transmission at a NAV-data rate will take a duration that correlates to the DATA-frame duration 708. The correlation may be done in a manner similar to any of the above-discussed embodiments.

A carrier-sensing operation may be done to ascertain whether the medium is available 712. If the medium is available, a physical-signaling block may be instructed to transmit a signal over a medium 716. In one embodiment, the signal may include the NAV frame followed by the DATA frame after a predetermined interval. If the medium is not available, the carrier-sensing operation may be repeated. In various embodiments, various events may be referenced as conditions precedent to repetition of the carrier-sensing operation 712. For example, in one embodiment a certain number of retries may be allotted before discarding data in an unsuccessful end and a retry counter may be referenced prior to a repeat carrier-sensing operation 712. In another embodiment, reference to a buffer timeout event may cause the data in the buffer to be discarded. In yet another embodiment, an operational delay may be executed prior to repetition of the carrier-sensing operation 712.

Figure 8:
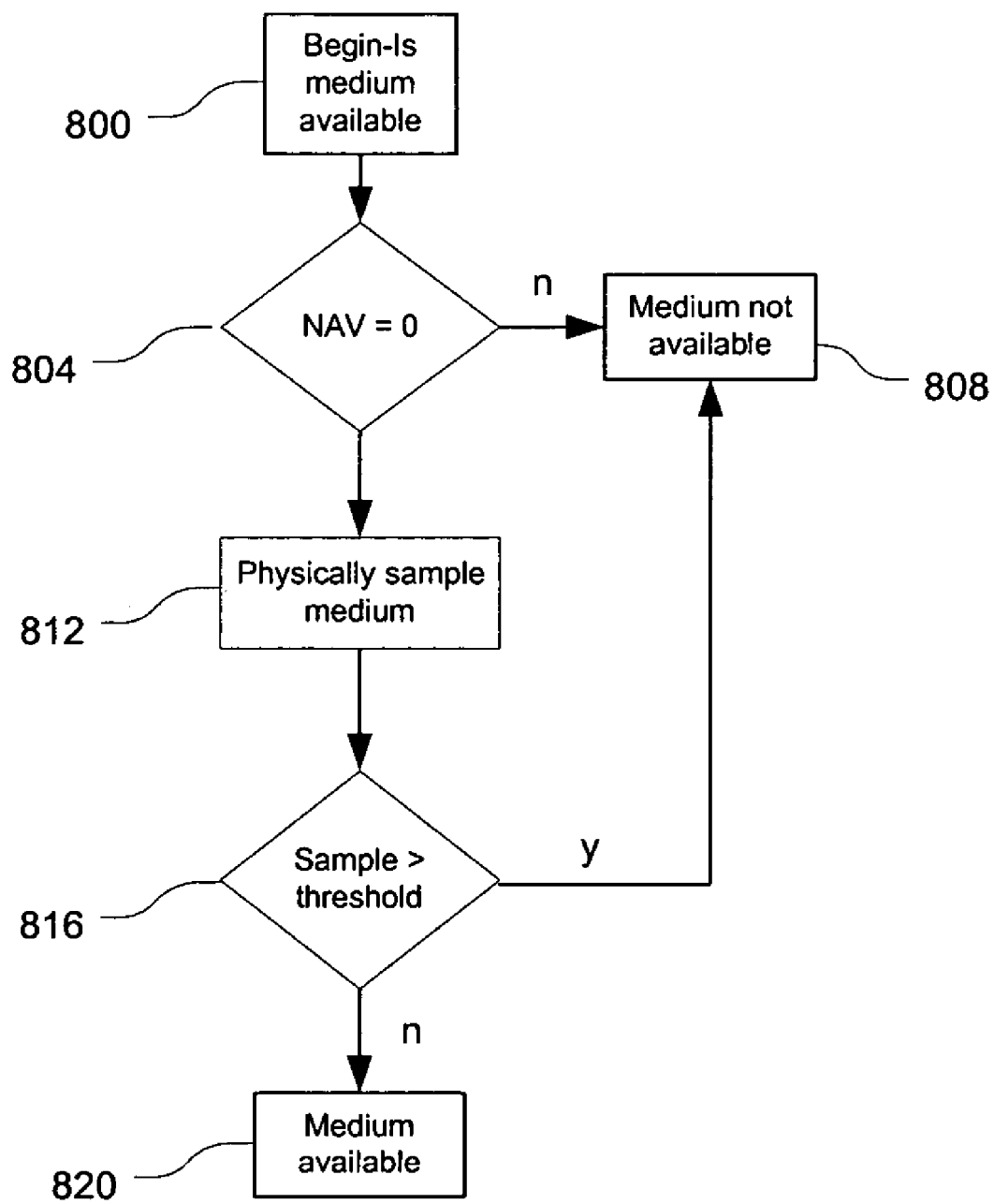
FIG. 8 illustrates an operational flow for the carrier sensing of the network interface controller in accordance with an embodiment of the present invention.

FIG. 8 illustrates an operational flow for the carrier-sensing operation 712 in accordance with an embodiment of the present invention. When a carrier-sensing operation is initiated 800, a node may reference its NAV 804. At this point, there may be no physical sensing of the medium and therefore this portion of the carrier-sensing operation may hereinafter also be referred to as virtual-carrier sensing. If a node's NAV indicates that the medium is expected to be occupied by another transmission, e.g., NAV <>0, the medium may be determined to be unavailable for use 808. If a node's NAV indicates that the medium is not expected to be occupied with another transmission, e.g., NAV=0, then the media-access control block may cause the physical-signaling group to physically sense the energy on the medium 812. The physical sample may be compared to an activity threshold 816. If the physical sample is less than the activity threshold, then the medium may be determined to be available for use 820. If the physical sample is greater than the activity threshold, the medium may be determined to be unavailable for use 808.

Allowing all of the nodes within an ESR of a transmitting node to update their NAVs based at least in part upon the duration of a NAV frame may result in fewer inaccurate NAVs. This may, in turn, increase the effectiveness of the virtual-carrier sensing resulting in fewer physical samples being taken when the medium is preoccupied. Less physical sampling may reduce overall power consumption required during carrier-sensing operations.

Accordingly, methods and apparatuses for virtual-carrier sensing using the duration of a NAV frame have been described. Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A method comprising:
generating, by a first node, a control frame having a control frame duration correlated to an intended data frame duration of an associated data frame, the control frame duration adapted to convey network allocation information;
transmitting, by the first node, over a medium the control frame for the control frame duration; and
transmitting, by the first node, over the medium the data frame for the data frame duration.

2. The method of claim 1, wherein the data frame duration is different than the control frame duration.

3. The method of claim 1, wherein the data frame and the control frame are transmitted in accordance with a carrier sensing multiple access with collision avoidance protocol, and the data frame comprises data to be transmitted to a second node.

4. The method of claim 3, wherein the control frame duration is adapted to convey network allocation information to a third node.

5. The method of claim 3, further comprising:
sensing by the first node for another frame received over another duration, said another frame indicating the second node's receipt of said data of the data frame.

6. The method of claim 1, wherein said transmitting of the data frame is done at a predetermined interval after said transmitting of the control frame.

7. The method of claim 1, wherein said transmitting of the control and data frames over the medium comprises transmitting the control and data frames over a wireless medium.

8. A method comprising:
sensing, by a first node, a control frame received for a control frame duration over a medium, the control frame duration collated to an intended data frame duration of a data frame and adapted to convey network allocation information;
determining, by the first node, the intended data frame duration associated with the data frame based at least in part on the control frame duration; and
maintaining, by the first node, a network allocation value indicating an anticipated preoccupation of the medium for the data frame duration.

9. The method of claim 8, farther comprising:
sensing by the first node the medium to determine the medium's availability for use; and
transmitting by the first node a signal if it is determined that the medium is available for use.

10. The method of claim 9, wherein sensing the medium comprises:
referencing the network allocation value to determine if medium is expected to be preoccupied;
physically sensing the medium to determine an energy level on the medium if it is determined that the medium is not expected to be preoccupied; and
determining that the medium is available for use if the energy level is less than a predetermined activity level.

11. An apparatus comprising:
a transmitter adapted to transmit a signal over a medium; and
a controller coupled to the transmitter, the controller adapted to generate, a control frame having a control frame duration correlated to an intended frame duration of an associated data frame, the control frame duration adapted to convey network allocation information; and
control the transmitter to transmit over the medium control frame the for the control frame duration and the data frame for the data frame duration.

12. The apparatus of claim 11, wherein the controller is further adapted to control the transmitter to transmit the data frame for the data frame duration that is different than the control frame duration.

13. The apparatus of claim 11, wherein the data frame and the control frame are transmitted in accordance with a carrier sensing multiple access with collision avoidance protocol, and the data frame comprises data to be transmitted to a receiving node.

14. The apparatus of claim 11, wherein the controller is further adapted to control the transmitter to transmit the data frame at a predetermined interval after controlling the transmitter to transmit the control frame.

15. The apparatus of claim 14, further comprising a receiver; the data frame comprises data; and the controller is further coupled to the receiver to detect for another frame received over another duration, said another frame indicating a second node's receipt of the data of the data frame.

16. The apparatus of claim 15, further comprising a transceiver having said transmitter and receiver.

17. A system comprising:
a network interface controller having a physical signaling block, and a media-access control block coupled to, and adapted to cooperate with, the physical signaling block to:
generate a control frame having a control frame duration correlated to an intended data frame duration of an associated data frame, the control frame duration adapted to convey network allocation information;
transmit over a medium the control frame for the control frame duration and the data frame for the data frame duration; and
a dipole antenna coupled to the network interface controller to facilitate said transmitting over the medium.

18. The system of claim 17, wherein the data frame duration is different than the control frame duration.

19. The system of claim 17, further comprising:
a processor coupled to the network interface controller.

20. The system of claim 19, wherein the system is a node selected from the group consisting of a palm-sized computing device, a tablet computing device, a desktop computing device, a network access device, a router, a hub, and a switch.

21. The system of claim 17, wherein the data frame and the control frame are transmitted in accordance with a carrier sensing multiple access avoidance protocol, and the data frame comprises data to be transmitted to a node communicatively coupled to the medium.

22. The system of claim 21, wherein the network interface is adapted to cooperate with the dipole antenna in a manner detect for another frame received over another duration indicating the node's receipt of said data.

23. The system of claim 17, wherein the control frame duration is adapted to convey network allocation information to a node.

* * * * *